United States Patent
Yang et al.

(10) Patent No.: US 9,696,565 B2
(45) Date of Patent: Jul. 4, 2017

(54) LIQUID CRYSTAL LENS AND LIQUID CRYSTAL GLASSES

(71) Applicants: BOE Technology Group Co., Ltd., Beijing (CN); Beijing BOE Optoelectronics Technology Co., Ltd., Beijing (CN)

(72) Inventors: Jiuxia Yang, Beijing (CN); Jiantao Liu, Beijing (CN); Feng Bai, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 307 days.

(21) Appl. No.: 14/388,053

(22) PCT Filed: Dec. 2, 2013

(86) PCT No.: PCT/CN2013/088332
§ 371 (c)(1),
(2) Date: Sep. 25, 2014

(87) PCT Pub. No.: WO2015/024322
PCT Pub. Date: Feb. 26, 2015

(65) Prior Publication Data
US 2016/0282635 A1    Sep. 29, 2016

(30) Foreign Application Priority Data

Aug. 20, 2013 (CN) .......................... 2013 1 0363374

(51) Int. Cl.
*G02C 7/08* (2006.01)
*G02C 11/00* (2006.01)
(Continued)

(52) U.S. Cl.
CPC ............... *G02C 7/083* (2013.01); *G02B 3/14* (2013.01); *G02C 11/10* (2013.01); *G02F 2001/294* (2013.01)

(58) Field of Classification Search
None
See application file for complete search history.

(56) References Cited

U.S. PATENT DOCUMENTS 5,434,687 A * 7/1995 Kawata ............. G02F 1/133753
349/110
9,612,504 B2 * 4/2017 Galstian .................... G02F 1/29
(Continued)

FOREIGN PATENT DOCUMENTS

| CN | 1155093 A | 7/1997 |
| CN | 1372650 A | 10/2002 |

(Continued)

OTHER PUBLICATIONS

Office action and search report from Chinese Patent Office for priority application 201310363374.5 dated Jun. 16, 2014.

*Primary Examiner* — Ryan Crockett
(74) *Attorney, Agent, or Firm* — Haug Partners LLP

(57) ABSTRACT

A liquid crystal lens comprises a first substrate and a second substrate which are aligned-and-assembled, and a liquid crystal layer disposed between the first and second substrates, the first substrate comprises a first transparent substrate base, and a first alignment film comprising first alignment grooves, the first alignment film is provided on the first transparent substrate base, the first alignment grooves extend to the edge of the liquid crystal lens in annular shapes with their geometric centers located at the geometric center of the liquid crystal lens, the second substrate comprises a second transparent substrate base, and a second alignment film comprising second alignment grooves corresponding to the first alignment grooves, and (Continued)

the second alignment film is provided on the second transparent substrate base, the liquid crystal layer is disposed between the first and second alignment films. The liquid crystal lens is applied to liquid crystal glasses.

20 Claims, 5 Drawing Sheets

(51) Int. Cl.
*G02B 3/14* (2006.01)
*G02F 1/29* (2006.01)

(56) References Cited

U.S. PATENT DOCUMENTS

| | | |
|---|---|---|
| 2004/0012739 A1 | 1/2004 | Yoon et al. |
| 2005/0231677 A1* | 10/2005 | Meredith ................ G02B 3/14 349/143 |
| 2006/0215107 A1* | 9/2006 | Horiuchi ........... G02F 1/133382 349/200 |
| 2011/0234954 A1* | 9/2011 | Hsu ......................... G02F 1/13 349/123 |
| 2012/0212696 A1* | 8/2012 | Trajkovska ............ G02C 7/083 349/123 |
| 2013/0208347 A1* | 8/2013 | Haddock ................... G02F 1/29 359/319 |
| 2014/0268026 A1* | 9/2014 | Pugh ....................... G02C 7/04 351/159.33 |
| 2015/0160475 A1* | 6/2015 | Yang ........................ G02C 7/04 351/159.03 |
| 2015/0316820 A1* | 11/2015 | Duston ..................... G02F 1/29 349/138 |

FOREIGN PATENT DOCUMENTS

| | | |
|---|---|---|
| CN | 102004351 A | 4/2011 |
| CN | 203444180 U | 2/2014 |
| JP | 4-322214 A | 11/1992 |
| JP | 6-324337 A | 11/1994 |

* cited by examiner

LIQUID CRYSTAL LENS AND LIQUID CRYSTAL GLASSES

This application is a 371 of PCT/CN2013/088332 filed on Dec. 2, 2013, which claims priority benefits from Chinese Patent Application Number 201310363374.5 filed Aug. 20, 2013, the disclosure of which is incorporated herein by reference.

FIELD OF THE INVENTION

The present invention relates to liquid crystal display technology, and in particular, to a liquid crystal lens and liquid crystal glasses.

BACKGROUND OF THE INVENTION

Daily-worn frame glasses are composed of lenses and a spectacle frame. Currently, the material used for manufacturing the lenses mostly are glass, resin, etc. In the glasses industry, there are strict requirements for the optical properties of the material of the lens, e.g. transmittance, refractive index and dispersion, etc. Among them, the refractive index of the lens plays a decisive role for the thickness of the lens.

For example, myopia glasses are simple optics for vision correction or eye protection, which use the principle of concave lens such that the image of an object becomes closer, thus a myopia patient wearing the myopia glasses can see the distant object clearly. On one hand, for the same lens material, the higher the degree of myopia is, the stronger the lens is, and the bigger the thickness of the lens is. One the other hand, for the same degree of myopia, the bigger the refractive index of the lens is, the smaller the thickness of the lens is.

SUMMARY OF THE INVENTION

The embodiments of the invention provide a liquid crystal lens and liquid crystal glasses, which can adjust vision, and correct ametropia.

In order to achieve the above object, following solutions are adopted in the embodiments of the invention.

In one aspect, there is provided a liquid crystal lens, which comprises a first substrate and a second substrate which are aligned-and-assembled, and a liquid crystal layer disposed between the first substrate and the second substrate, wherein the first substrate comprises a first transparent substrate base, and a first alignment film comprising a plurality of first alignment grooves, the first alignment film is provided on the first transparent substrate base, the first alignment grooves extend to the edge of the liquid crystal lens in annular shapes with a geometric center located at the geometric center of the liquid crystal lens, the second substrate comprises a second transparent substrate base, and a second alignment film comprising a plurality of second alignment grooves, the second alignment grooves correspond to the first alignment grooves, and the second alignment film is provided on the second transparent substrate base, and the liquid crystal layer is disposed between the first alignment film and the second alignment film.

Preferably, the depths of the first alignment grooves and the second alignment grooves sequentially increase from the geometric center to the edge of the liquid crystal lens.

Preferably, the depths of the first alignment grooves and the second alignment grooves sequentially decrease from the geometric center to the edge of the liquid crystal lens.

Preferably, the annular shape comprises a circle shape or an oval shape.

Further preferably, the liquid crystal lens further comprises a plurality of transistors provided on the first transparent substrate base, a plurality of first electrodes each of which is electrically connected to a drain or a source of one transistor, and a plurality of second electrodes provided on the first transparent substrate base or the second transparent substrate base.

Further preferably, the plurality of transistors comprise thin film transistors.

In another aspect, there is provided liquid crystal glasses comprising lenses and a spectacle frame, the spectacle frame comprises two optical frames for the left and right eyes which are joined together and two legs connected to the optical frames, wherein the lenses are the liquid crystal lenses mentioned above.

Preferably, the liquid crystal lens comprises a plurality of transistors, a plurality of first electrodes and a plurality of second electrodes, the liquid crystal glasses further comprises a driving module provided inside the spectacle frame and used for driving the liquid crystal molecules in the liquid crystal layer of the liquid crystal lens to deflect.

Further preferably, the liquid crystal glasses further comprise at least one camera provided on the surface of the spectacle frame, and a gesture identifying module and a control module provided inside the spectacle frame; wherein the at least one camera is used for capturing a gesture of a user and transmitting it to the gesture identifying module; the gesture identifying module is used for obtaining a gesture instruction corresponding to the gesture based on the captured gesture and transmitting the gesture instruction to the control module; and the control module is used for controlling the driving module to drive the liquid crystal molecules in the liquid crystal layer of the liquid crystal lens to deflect based on the gesture instruction.

Preferably, the gesture identifying module comprises a memory unit for storing a corresponding relationship between the gesture and the gesture instruction.

Preferably, the number of the at least one camera is one, and the camera is provided on either of the optical frames or at the joint of the optical frames.

Preferably, the number of the at least one camera is two, and the cameras are provided on the optical frames respectively.

Preferably, the liquid crystal glasses further comprise at least one power supply device provided inside the legs.

Preferably, the liquid crystal glasses further comprise a switch for controlling the power supply of the power supply device.

The embodiments of the invention provide a liquid crystal lens and liquid crystal glasses, the liquid crystal lens comprises a first substrate and a second substrate which are aligned-and-assembled, and a liquid crystal layer disposed between the first substrate and the second substrate, wherein the first substrate includes a first transparent substrate base, and a first alignment film including a plurality of first alignment grooves provided on the first transparent substrate base, the first alignment grooves extend to the edge of the liquid crystal lens in annular shapes with their geometric centers located at the geometric center of the liquid crystal lens; the second substrate comprises a second transparent substrate base, and a second alignment film comprising a plurality of second alignment grooves provided on the second transparent substrate base, the second alignment grooves corresponding to the first alignment grooves, and the liquid crystal layer is disposed between the first alignment film and the second alignment film. The liquid crystal molecules in the liquid crystal layer are arranged in the alignment grooves in a certain law so that the liquid crystal lens may obtain a desired refractive index and the user's demand on diopter may be satisfied, thus adjusting vision, and correcting ametropia.

BRIEF DESCRIPTION OF THE DRAWINGS

To more clearly describe the embodiments of the present invention and the technical solutions in the prior art, the drawings that are used in describing the embodiments and the prior art will be briefed hereinafter. Obviously, the drawings described hereinafter are only embodiments of the present invention, and one skilled in the art can obtain other drawings from such drawings without ingenuity work.

DESCRIPTION OF REFERENCE NUMBERS

10—liquid crystal lens; 101—first substrate; 1011—first transparent substrate base; 1012—first alignment groove; 1013—first alignment film; 102—second substrate; 1021—second transparent substrate base; 1022—second alignment groove; 1023—second alignment film; 103—liquid crystal layer; 20—spectacle frame; 201—optical frame; 202—leg; 30—power supply device; 40—driving module; 50—camera; 60—gesture identifying module; 70—control module.

DETAILED DESCRIPTION OF THE INVENTION

The technical solutions in the embodiments of the present invention will be described clearly and thoroughly hereinafter in combination with the drawings of the embodiments of the present invention. Obviously, the embodiments described herein are only a part, rather than all, of the embodiments of the present invention. All the other embodiments obtained by skilled persons in the art in light of the embodiments of the present invention fall within the protection scope of the present invention.

Figure 1:
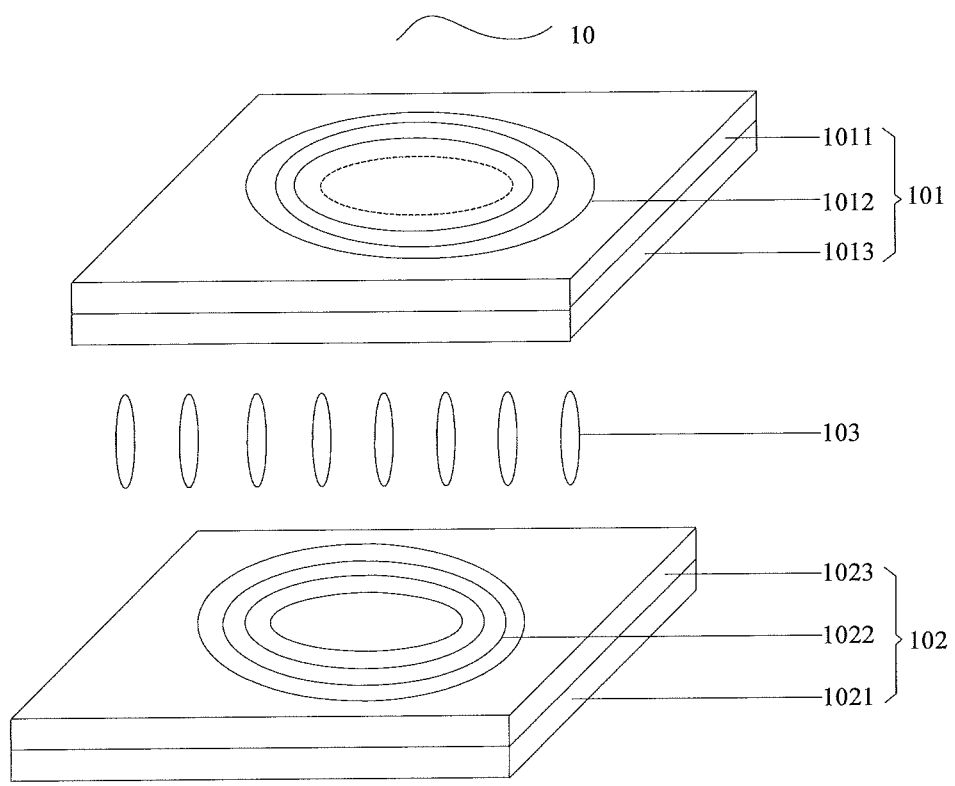
FIG. 1 is a structure diagram of a liquid crystal lens according to an embodiment of the invention.

As shown in FIG. 1, a liquid crystal lens 10 in an embodiment of the invention comprises a first substrate 101 and a second substrate 102 which are aligned-and-assembled, and a liquid crystal layer 103 disposed between the first substrate and the second substrate. The first substrate 101 comprises a first transparent substrate base 1011, and a first alignment film 1013 including a plurality of first alignment grooves 1012 and provided on the first transparent substrate base 1011, and the first alignment grooves 1012 extend to the edge of the liquid crystal lens 10 in annular shapes with their geometric centers located at the geometric center of the liquid crystal lens 10. The second substrate 102 comprises a second transparent substrate base 1021, and a second alignment film 1023 comprising a plurality of second alignment grooves 1022 and provided on the second transparent substrate base, and the second alignment grooves 1022 correspond to the first alignment grooves 1012.

The first alignment grooves 1012 and the second alignment grooves 1022, on one hand, can fix the liquid crystal molecules in the grooves and adjust the arrangement of the liquid crystal molecules, and on the other hand, can divide the liquid crystal molecules in the liquid crystal layer 103 into a plurality of annular regions, geometric centers of which are located at the geometric center of the liquid crystal lens 10, and the annular regions have different radius.

When the liquid crystal lens 10 is used as a lens for myopia, as the lens is a concave lens whose refractive index increases from its geometric center to its edge. Therefore, the first alignment grooves 1012 and the second alignment grooves 1022 may divide the space between them into a plurality of annular regions, geometric centers of which are located at the geometric center of the liquid crystal lens 10, and the annular regions have different radius. Then liquid crystal molecules with different refractive indexes are injected into these regions, so that the refractive indexes of liquid crystal molecules in these annular regions increase sequentially from the geometric center of the lens to the edge thereof.

When the liquid crystal lens 10 is used as a lens for hypermetropia, as the lens is a convex lens whose refractive index decreases from its geometric center to its edge. Therefore, the first alignment grooves 1012 and the second alignment grooves 1022 may divide the space between them into a plurality of annular regions, geometric centers of which are located at the geometric center of the liquid crystal lens 10, and the annular regions have different radius. Then liquid crystal molecules with different refractive indexes are injected into these regions, so that the refractive indexes of liquid crystal molecules in these annular regions decrease sequentially from the geometric center of the lens to the edge thereof.

Of course, liquid crystals in different annular regions may have the same refractive index through, for example, injecting the liquid crystals with the same refractive indexes thereinto so that the liquid crystal lens 10 is used as a plane lens.

The following should be noted. First, the shapes of the alignment grooves of the liquid crystal lens 10 may be any one of circle, oval, rectangle and trapezoid, so long as they can be closed, so they are not limited herein.

Second, the second alignment grooves 1022 corresponds to the first alignment grooves 1012, which means that their projections are overlapped, and if the first alignment grooves 1012 have the same depth, then the second alignment grooves 1022 also have the same depth; and if the first alignment grooves 1012 have different depths, then the second alignment grooves 1022 also have different depths. That is, the first alignment grooves 1012 and the second alignment grooves 1022 have the same depths at corresponding positions.

In the embodiment of the invention, the depths of the first alignment grooves 1012 and the second alignment grooves 1022 are designed depending on the refractive indexes of the liquid crystal molecules in the liquid crystal layer 103, so that the liquid crystal molecules, the depths of the alignment grooves and the liquid crystal layer 103 may match each other best, thereby the demand on the refractive index of concave lens and convex lens may be met.

Third, the first transparent substrate base 1011 and the second transparent substrate base 1021 may be made of transparent glass or transparent resin.

An embodiment of the invention provides a liquid crystal lens 10 comprising a first substrate 101 and a second substrate 102 which are aligned-and-assembled, and a liquid crystal layer 103 disposed between the first substrate and the second substrate. The first substrate 101 comprises a first transparent substrate base 1011, and a first alignment film 1013 including a plurality of first alignment grooves 1012 provided on the first transparent substrate base 1011, and the first alignment grooves 1012 extend to the edge of the liquid crystal lens 10 in annular shapes with their geometric centers located at the geometric center of the liquid crystal lens 10. The second substrate 102 comprises a second transparent substrate base 1021, and a second alignment film 1023 comprising a plurality of second alignment grooves 1022 provided on the second transparent substrate base 1021, and the second alignment grooves 1022 corresponds to the first alignment grooves 1012. As such, by arranging the liquid crystal molecules in the liquid crystal layer 103 into the alignment grooves according to certain laws so that the liquid crystal lens 10 has a desired refractive index and the user's demand on the diopter is met, thus adjusting vision and correcting ametropia.

Figure 2:
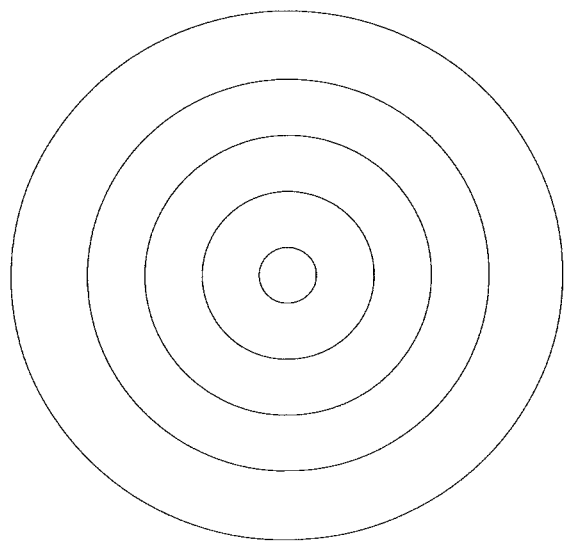
FIG. 2 is a diagram showing one example of shapes of alignment grooves applied to the alignment film of the liquid crystal lens according to the embodiment of the invention.
Figure 3:
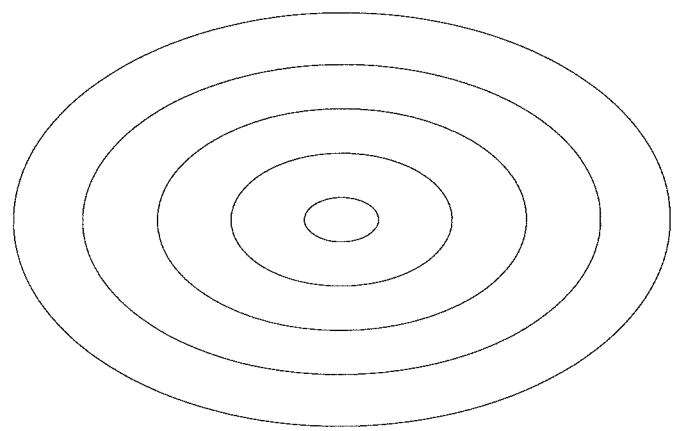
FIG. 3 is a diagram showing another example of shapes of alignment grooves applied to the alignment film of the liquid crystal lens according to the embodiment of the invention.

The shapes of the alignment grooves may be arbitrary closed shapes. However, when the shapes of the alignment grooves are rectangles or trapezoids, the alignment grooves will have sharp angles, which will affect the operation of the liquid crystal molecules in the liquid crystal layer 103, thus in turn causing poor display quality. Accordingly, as shown in FIGS. 2 and 3, the shapes of the alignment grooves are preferably circles or ovals in the embodiment of the invention.

Preferably, the depths of the first alignment grooves 1012 and the second alignment grooves 1022 may be increased sequentially from the geometric center to the edge of the liquid crystal lens, or decreased sequentially from the geometric center to the edge of the liquid crystal lens.

Whether the liquid crystal lens 10 is a concave lens or a convex lens depends on combination of the liquid crystals, the depths of the alignment grooves and the thickness of the liquid crystal layer. With the adjustment of the arrangement of the liquid crystal molecules inside the alignment grooves so that demands on different refractive indexes are met, the focal length may be adjusted, thereby the user's demand on various myopic degrees or hypermetropia degrees may be met.

Herein, the manufacture process of the alignment grooves may be any one of rubbing alignment process, optical alignment process, atomic beam bombardment process, etc., so long as the alignment grooves may be manufactured to have desired shapes and depths. However, as the liquid crystal lens 10 belongs to glasses industry, therefore, in considering of process accuracy and process cost, the optical alignment process is preferably used as the process for manufacturing the alignment grooves in the invention.

The liquid crystal lens 10 further comprises a plurality of transistors provided on the first transparent substrate base 1011, a plurality of first electrodes each of which is electrically connected to one electrode of one transistor, and a plurality of second electrodes provided on the first transparent substrate base 1011 or the second transparent substrate base 1021. The one electrode of the one transistor may be a source or a drain according to the types of the transistors.

Herein, the second electrode may be provided on the second transparent substrate base 1021, thus a vertical electric field may be formed between the first electrodes and the second electrodes to control the deflection of the liquid crystal molecules in the liquid crystal layer 103. Alternatively, the second electrodes may be provided on the first transparent substrate base 1011, thus a transverse electric field may be formed between the first electrodes and the second electrodes to control the deflection of the liquid crystal molecules in the liquid crystal layer 103.

The transistors and the first electrodes provided on the first transparent substrate base 1011 may be formed by a manufacture process similar to that for manufacturing the transistors and pixel electrodes in the current array substrate. The transistors may be thin film transistors so that the market demand on thinning may be met. The first substrate 101 may further comprise data lines connected to sources of the transistors, and through the data lines the first electrode may be charged to achieve the deflection of the liquid crystal molecules together with the contributions of the second electrode.

When the liquid crystal lens 10 is used as a lens for myopia, the voltages between the first electrodes and the second electrodes may be adjusted so that the liquid crystal molecules in various annular regions may deflect at respective angles, thus the refractive indexes of the liquid crystal molecules are controlled to be increased sequentially from the geometric center of the lens to the edge thereof. Further, a fine adjustment of the focal length of the concave lens may be conducted depending on the user's demand on the myopia degree.

When the liquid crystal lens 10 is used as a lens for hypermetropia, the voltages between the first electrodes and the second electrodes may be adjusted so that the liquid crystal molecules in various annular regions may deflect at respective angles, thus the refractive indexes of the liquid crystal molecules are controlled to be decreased sequentially from the geometric center of the lens to the edge thereof. Further, a fine adjustment of the focal length of a convex lens may be conducted depending on the user's demand on the hypermetropia degree.

Further, in the case of the liquid crystal lens 10 comprising a plurality of transistors provided on the first transparent substrate base 1011, a plurality of first electrodes each of which is electrically connected to one electrode of one transistor, and a plurality of second electrodes provided on the first transparent substrate base 1011 or the second transparent substrate base 1021, the liquid crystals in the liquid crystal layer 103 may be the same liquid crystals with the same refractive index, or may be different liqUid crystals with different refractive indexes.

In the case of the liquid crystals in the liquid crystal layer 103 being different liquid crystals with different refractive indexes, the different liquid crystals with different refractive indexes may be arranged according to certain laws depending on the use of the liquid crystal lens 10.

For example, when the liquid crystal lens 10 is used for myopia glasses, in the ascending order of the refractive indexes, the liquid crystals with different refractive indexes are successively filled into the annular regions from inside to outside; when the liquid crystal lens 10 is used for hypermetropia glasses, in the descending order of the refractive indexes, the liquid crystals with different refractive indexes are successively filled into the annular regions from inside to outside.

Moreover, the depths of the alignment grooves in the different annular regions may be the same, or may be different. In the case that the same liquid crystals are injected into the liquid crystal layer 103 of the liquid crystal lens 10 and the voltages between the first electrodes and the second electrodes are the same, when the depths of the alignments grooves are different, the liquid crystal layer 103 has different thicknesses, thus resulting in different focal lengths.

Accordingly, when the alignment grooves have different depths, the depths may be set according to the refractive indexes of the liquid crystals in the liquid crystal layer 103 so that the liquid crystals, the depths of the alignment grooves, the thickness of the liquid crystal layer 103, and the voltages between the first electrodes and the second electrodes may match each other best, thereby the fine adjustment of the focal length may be achieved.

For example, in the case of the depths of the alignment grooves being increased sequentially from the geometric center to the edge of the lens, the same kind of liquid crystals or different kinds of liquid crystals may be injected thereinside. The refractive indexes of the liquid crystals in various annular regions may be increased sequentially from the geometric center to the edge of the liquid crystal lens 10 through controlling the voltages between the first electrodes and the second electrodes, so that the liquid crystal lens 10 functions as a concave lens. As such, the refractive indexes of the liquid crystals in various annular regions may be decreased sequentially from the geometric center to the edge in the liquid crystal lens 10 through controlling the voltages between the first electrodes and the second electrodes, so that the liquid crystal lens 10 functions as a convex lens.

In the case of the depths of the alignment grooves being decreased sequentially from the geometric center to the edge of the lens, the same kind of liquid crystals or different kinds of liquid crystals may be injected thereinside. The refractive indexes of the liquid crystals in various annular regions may be decreased sequentially from the geometric center to the edge in the liquid crystal lens 10 through controlling the voltages between the first electrodes and the second electrodes, so that the liquid crystal lens 10 functions as a convex lens. As such, the refractive indexes of the liquid crystals in various annular regions may be increased sequentially from the geometric center to the edge in the liquid crystal lens 10 through controlling the voltages between the first electrodes and the second electrodes, so that the liquid crystal lens 10 functions as a concave lens.

Various refractive indexes may be realized in the alignment grooves by adjusting the arrangement of the liquid crystal molecules therein, so that the adjustment of the focal length may be achieved, thereby the user's demand on various myopia degrees or hypermetropia degrees can be satisfied.

A liquid crystal lens 10 is provided in the embodiment of the invention, wherein the refractive indexes of the liquid crystals in the liquid crystal layer 103 may be adjusted according to the user's demands, so that the liquid crystal lens 10 may function as a concave lens, a convex lens or a plane lens. In other words, when the refractive indexes of the liquid crystals of the liquid crystal layer 103 in various annular regions divided by the alignment grooves are adjusted to be increased sequentially from inside to outside, the liquid crystal lens 10 may be made to function as a myopia lens; when the refractive indexes of the liquid crystals of the liquid crystal layer 103 in various annular regions divided by the alignment grooves are adjusted to be decreased sequentially from inside to outside, the liquid crystal lens 10 may be made to function as a hypermetropia lens; and when the refractive indexes of the liquid crystals of the liquid crystal layer 103 in various annular regions divided by the alignment grooves are the same from inside to outside, the liquid crystal lens 10 may be made to function as a plane lens. Moreover, when the liquid crystal lens 10 functions as a myopia lens or a hypermetropia lens, fine adjustment of the focal length may be performed through adjusting the refractive indexes of the liquid crystals in the alignment grooves, so that different user's demands on the degree of the lens may be satisfied.

Figure 4:
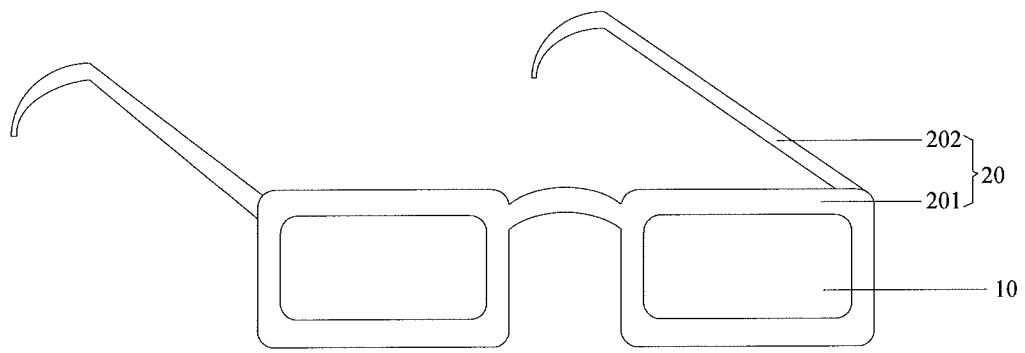
FIG. 4 is a structure diagram of liquid crystal glasses according to an embodiment of the invention.

An embodiment of the invention provides liquid crystal glasses, as shown in FIG. 4, comprising above lenses 10 and a spectacle frame 20, the spectacle frame 20 comprises two optical frames 201 for the left and right eyes which are joined together and glasses legs (herein below called "legs" for short) 202 connected to the optical frames.

In addition to fixedly supporting the liquid crystal lenses 10, the spectacle frame 20 may further comprises some miniature parts provided thereinside to ensure that the liquid crystal lenses 10 work properly. Moreover, these parts are provided inside the spectacle frame 20 so that the liquid crystal glasses look more beautiful.

Figure 5:
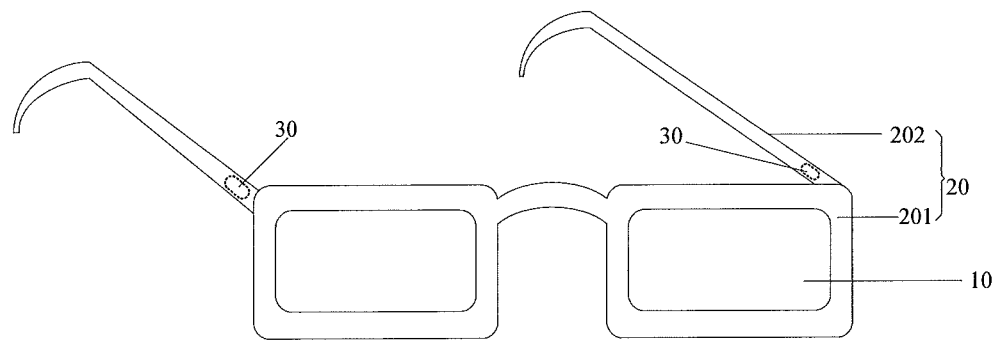
FIG. 5 is a structure diagram of liquid crystal glasses including a power supply device according to an embodiment of the invention.

As shown in FIG. 5, preferably, the liquid crystal glasses 10 further comprise at least one power supply device 30, which may be provided inside the legs 202. Here, if the at least one power supply device 30 are provided, the at least one power supply device 30 may be provided inside two legs 202 respectively and connected to each other in series.

Furthermore, the liquid crystal glasses may further comprise a switch for controlling the power supply of the power supply device 30. Thus, the switch may be turned off when the liquid crystal glasses are not worn, so that the liquid crystal lenses 10 of the liquid crystal glasses stop operating. The switch may be turned on when the liquid crystal glasses are worn, so that the liquid crystal lenses 10 of the liquid crystal glasses operate normally. Herein, the switch may be provided on the surface of the leg 202 so as to be controlled easily by the user.

Figure 6:
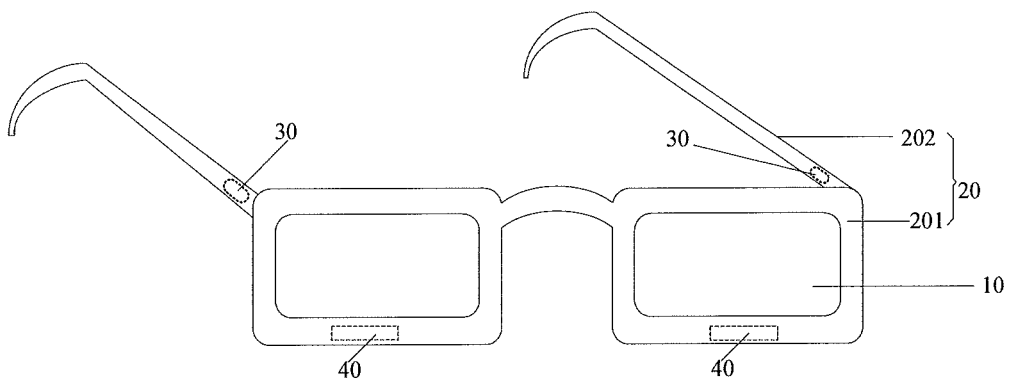
FIG. 6 is a structure diagram of liquid crystal glasses including a driving module according to an embodiment of the invention.

Preferably, as shown in FIG. 6, in the case that the liquid crystal lens 10 comprises a plurality of transistors, a plurality of first electrodes and a plurality of second electrodes, the liquid crystal glasses further comprise a driving module 40 provided inside the spectacle frame 20 and for driving the liquid crystal molecules in the liquid crystal layer 103 of the liquid crystal lens 10 to deflect.

Herein, inside each of the optical frames 201, there may be provided one driving module 40 to drive the liquid crystal molecules in various annular regions in the liquid crystal layer 103 of the liquid crystal lens 10 in corresponding optical frame 201 to deflect at corresponding angles respectively. Alternatively, only one driving module 40 may be provided at an arbitrary position of the spectacle frame 20 to drive the liquid crystal molecules in various annular regions in the liquid crystal layer 103 of the liquid crystal lenses 10 in the two optical frames 201 to deflect at corresponding angles respectively.

In the embodiment of the invention, the alignment grooves of the liquid crystal lens 10 have geometric centers located at the geometric center of the liquid crystal lens 10 and extend towards the edge in annular shapes, and thus the liquid crystal lens 10 is divided into a plurality of annular regions. The driving module 40 may apply driving voltages to the different annular regions of the liquid crystal lens 10 as desired, to drive the liquid crystal molecules in each of the annular regions to deflect at a certain angle, so as to control the refractive indexes of the liquid crystals in the annular regions to be, for example, increased or decreased sequentially from the geometric center to the edge of the liquid crystal lens 10, thereby the liquid crystal lens 10 can function as a myopia lens or a hypermetropia lens.

It should be noted that the driving voltages applied to the different annular regions should be determined depending on refractive indexes of the liquid crystals in the different annular regions, the depths of the alignment grooves, and the thickness of the liquid crystal layer, so that these parameters may match each other best, and a fine adjustment of the focal length can be realized.

Figure 7:
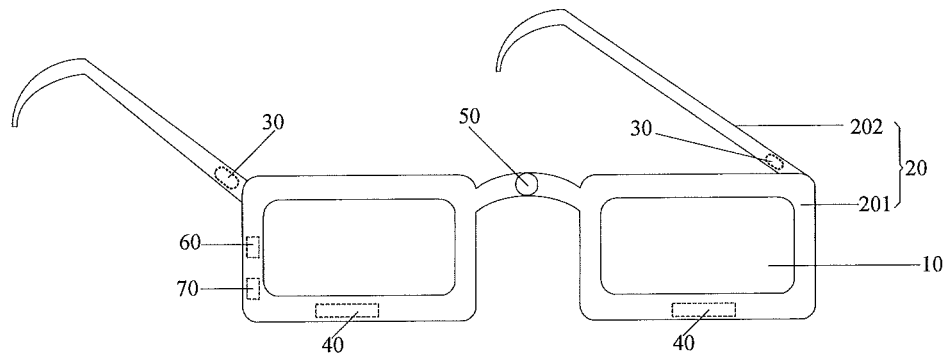
FIG. 7 is a structure diagram showing one example of liquid crystal glasses including a camera, a gesture identifying module and a control module according to an embodiment of the invention.
Figure 8:
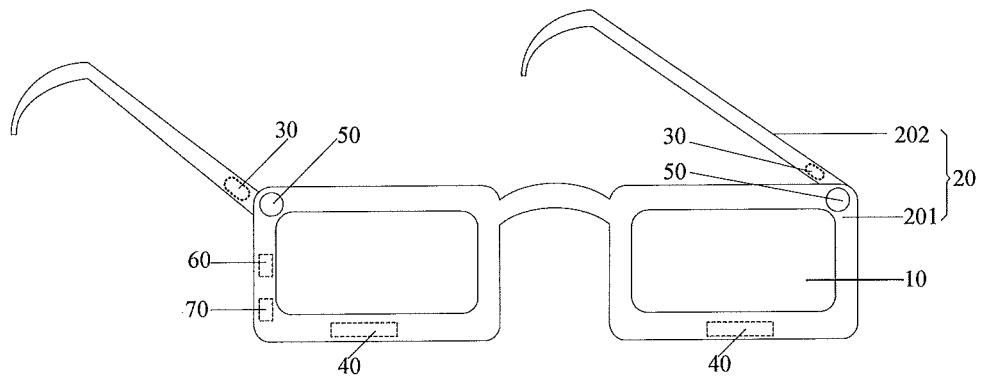
FIG. 8 is a structure diagram showing another example of a liquid crystal lens including a camera, a gesture identifying module and a control module according to an embodiment of the invention.

Further preferably, as shown in FIGS. 7 and 8, the liquid crystal glasses comprise at least one camera 50 provided on the surface of the spectacle frame 20, and a gesture identifying module 60 and a control module 70 provided inside the spectacle frame 20; wherein the at least one camera 50 captures a gesture of a user and transmits it to the gesture identifying module 60. The gesture identifying module 60 obtains a gesture instruction corresponding to the gesture through comparing the captured gesture and transmits it to the control module 70. The control module 70 controls the driving module 40 to drive the liquid crystal molecules in different annular regions in the liquid crystal layer 103 of the liquid crystal lens 10 to deflect at certain angles based on the gesture instruction.

Thus, both the two liquid crystal lenses 10 may be adjusted by the user by posing corresponding gestures. For example, when the liquid crystal glasses are used as myopia glasses, the focal lengths of the left and right liquid crystal lenses 10 may be adjusted, to correct the myopia degrees. Alternatively, when the liquid crystal glasses are used as myopia glasses, the focal lengths of the left and right liquid crystal lenses 10 may be adjusted, to correct the hypermetropia degrees.

It should be noted that, herein, only one camera 50 or a plurality of cameras 50 may be provided. In the case that the viewing effect of the liquid crystal glasses will not be affected, the position where the camera 50 is provided is not limited, so long as the camera may capture the user's gesture and transmit it to the gesture identifying module 60.

Both the number of the gesture identifying module 60 and the number of the control module 70 may be one, and their positions are not limited.

Furthermore, the gesture identifying module 60 comprises a memory unit for storing a corresponding relationship between the gesture and the gesture instruction.

Herein, various gestures may be defined in advance and their meanings are represented by gesture instructions, and the gestures and the gesture instructions are stored in the memory unit of the gesture identifying module 60 in a form of one-to-one correspondence.

Specifically, when a user poses a gesture with a certain meaning, the camera 50 captures the gesture and transmits it to the gesture identifying module 60. At this time, the gesture identifying module 60 compares the gesture with the gestures stored in the memory unit thereof, acquires a gesture instruction corresponding to the gesture if the gesture is consistent with one of the stored gestures, and decodes the gesture instruction and transmits the decoded gesture instruction to the control module 70. The control module 70 control the driving module 40 to drive the liquid crystal molecules in the annular regions of the liquid crystal lenses 10 to deflect based on the decoded gesture instruction, so as to achieve adjustment of the focal length.

Preferably, referring to FIG. 7, there is one camera 50 provided to the liquid crystal glasses, and the camera 50 is provided on either of the optical frames 201 or at the joint between the optical frames 201.

In this case, the memory unit of the gesture identifying module 60 has a gesture instruction for the left liquid crystal lens 10 and a gesture instruction for the right liquid crystal lens 10 stored therein. That is, after the camera 50 captures a specific gesture posed by a user and transmits it to the gesture identifying module 60, the gesture identifying module 60 first compares the gesture with the gestures stored in the memory unit thereof to determine whether the gesture corresponds to a gesture instruction for the left liquid crystal lens 10 or a gesture instruction for the right liquid crystal lens 10, thus, the corresponding liquid crystal lens 10 may be adjusted through subsequent gestures.

Preferably, referring to FIG. 8, there are two cameras 50 provided to the liquid crystal glasses, and the cameras 50 are provided on the optical frames 201 respectively.

In this case, the camera 50 provided on the left captures a gesture for the left liquid crystal lens 10, and the camera 50 provided on the right captures a gesture for the right liquid crystal lens 10, thus the two liquid crystal lenses 10 may be adjusted respectively.

Hereinafter, the above liquid crystal glasses will be described in detail by providing a specific embodiment.

For example, the liquid crystal glasses may comprise two liquid crystal lenses 10 corresponding to the left eye and the right eye respectively and a spectacle frame 20.

The liquid crystal lens 10 comprises a first substrate 101 and a second substrate 102 which are aligned-and-assembled, and a liquid crystal layer 103 disposed between the first substrate and the second substrate. The first substrate 101 comprises a first transparent substrate base 1011, a plurality of transistors provided on the first transparent substrate base 1011, a plurality of first electrodes each of which is electrically connected to one electrode of one transistor, and a first alignment film 1013 comprising a plurality of first alignment grooves 1012, the first alignment grooves 1012 extend to the edge of the liquid crystal lens 10 in annular shapes with their geometric centers located at the geometric center of the liquid crystal lens 10. The second substrate 102 comprises a second transparent substrate base 1021, a plurality of second electrodes provided on the second transparent substrate base 1021, and a second alignment film 1023 comprising a plurality of second alignment grooves 1022, the second alignment grooves 1022 correspond to the first alignment grooves 1012. The depths of the alignment grooves are sequentially increased from the geometric center outwards, and liquid crystals in the liquid crystal layer 103 are the same liquid crystals with the same refractive index.

The spectacle frame 20 comprises two optical frames 201 joined together and corresponding to the left eye and the right eye respectively, and legs 202 connected to the optical frames. The spectacle frame 20 further comprises at least one power supply device 30 provided inside the legs 202, driving modules 40 provided inside the optical frames 201 respectively, cameras 50 provided on the surfaces of the two optical frames 201 respectively, and a gesture identifying module 60 and a control module 70 provided inside the spectacle frame 20. The gesture identifying module 60 comprises a memory unit for storing a corresponding relationship between certain gestures and the gesture instructions.

Figure 9:
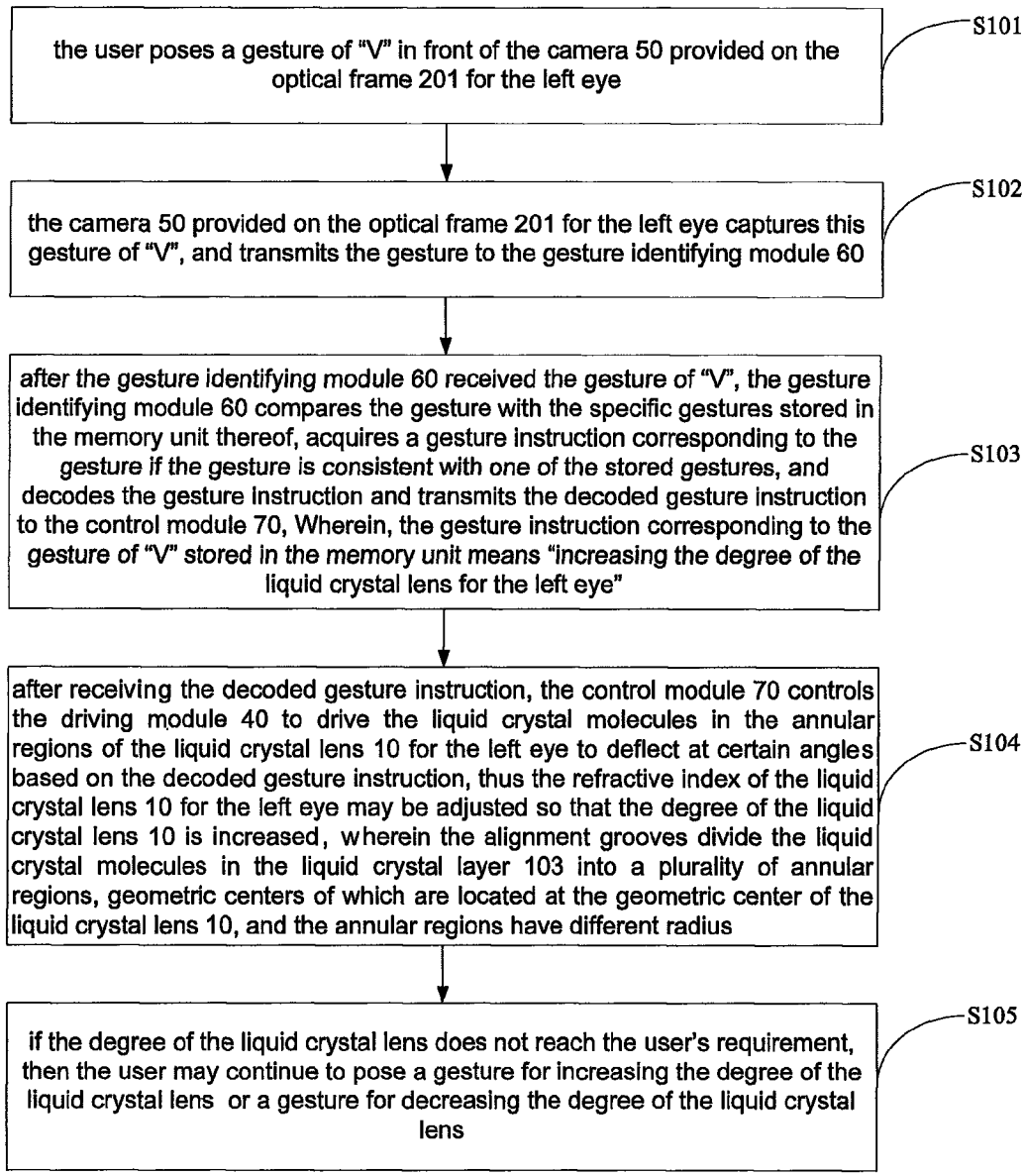
FIG. 9 is a diagram showing an adjusting process of the liquid crystal glasses according to an embodiment of the invention.

When a myopia user wears the liquid crystal glasses and it is required to adjust the focal length of the liquid crystal lens 10 for the left eye, for example, as shown in FIG. 9, the following steps will be performed.

Step S101, the user poses a gesture of "V" in front of the camera 50 provided on the optical frame 201 for the left eye.

Step S102, the camera 50 provided on the optical frame 201 for the left eye captures this gesture of "V", and transmits the gesture to the gesture identifying module 60.

Step S103, after the gesture identifying module 60 received the gesture of "V", the gesture identifying module 60 compares the gesture with the specific gestures stored in the memory unit thereof, acquires a gesture instruction corresponding to the gesture if the gesture is consistent with one of the stored gestures, and decodes the gesture instruction and transmits the decoded gesture instruction to the control module 70.

Wherein, the gesture instruction corresponding to the gesture of "V" stored in the memory unit means "increasing the degree of the liquid crystal lens for the left eye".

Step 104, after receiving the decoded gesture instruction, the control module 70 controls the driving module 40 to drive the liquid crystal molecules in the annular regions of the liquid crystal lens 10 for the left eye to deflect at certain angles based on the decoded gesture instruction, thus the refractive index of the liquid crystal lens 10 for the left eye may be adjusted so that the degree of the liquid crystal lens 10 is increased.

Wherein the alignment grooves divide the liquid crystal molecules in the liquid crystal layer 103 into a plurality of annular regions, geometric centers of which are located at the geometric center of the liquid crystal lens 10, and the annular regions have different radius.

Step 105, if the degree of the liquid crystal lens 10 does not reach the user's requirement, then the user may continue to pose a gesture for increasing the degree of the liquid crystal lens 10 or a gesture for decreasing the degree of the liquid crystal lens 10.

Described above are just specific embodiments of the present invention, while the scope of protection of the present invention is not limited to this, any person skilled in this field can easily conceive changes and substitutions within the technical scope disclosed, by the present invention, which shall be covered in the scope of protection of the present invention, thus, the scope of protection of the present invention shall be defined by the scope of protection of the claims.

What is claimed is:

1. A liquid crystal lens, comprising a first substrate and a second substrate which are aligned-and-assembled, and a liquid crystal layer disposed between the first substrate and the second substrate, wherein
   the first substrate comprises a first transparent substrate base, and a first alignment film comprising a plurality of first alignment grooves, the first alignment film is provided on the first transparent substrate base, the first alignment grooves extend to the edge of the liquid crystal lens in annular shapes with a geometric center located at the geometric center of the liquid crystal lens,
   the second substrate comprises a second transparent substrate base, and a second alignment film comprising a plurality of second alignment grooves, the second alignment grooves correspond to the first alignment grooves, and the second alignment film is provided on the second transparent substrate base,
   the liquid crystal layer is disposed between the first alignment film and the second alignment film,
   wherein alignment grooves of the plurality of first alignment grooves and alignment grooves of the plurality of second alignment grooves corresponding to the alignment grooves of the plurality of first alignment grooves form annular regions, and
   wherein annular regions are isolated from each other.

2. The liquid crystal lens according to claim 1, wherein the depths of the first alignment grooves and the second alignment grooves sequentially increase from the geometric center to the edge of the liquid crystal lens.

3. The liquid crystal lens according to claim 2, further comprising a plurality of transistors provided on the first transparent substrate base, a plurality of first electrodes each of which is electrically connected to a drain or a source of one transistor, and a plurality of second electrodes provided on the first transparent substrate base or the second transparent substrate base.

4. The liquid crystal lens according to claim 3, wherein the plurality of transistors comprise thin film transistors.

5. The liquid crystal lens according to claim 1, wherein the depths of the first alignment grooves and the second alignment grooves sequentially decrease from the geometric center to the edge of the liquid crystal lens.

6. The liquid crystal lens according to claim 5, further comprising a plurality of transistors provided on the first transparent substrate base, a plurality of first electrodes each of which is electrically connected to a drain or a source of one transistor, and a plurality of second electrodes provided on the first transparent substrate base or the second transparent substrate base.

7. The liquid crystal lens according to claim 6, wherein the plurality of transistors comprise thin film transistors.

8. The liquid crystal lens according to claim 1, wherein the annular shape comprises a circle shape or an oval shape.

9. The liquid crystal lens according to claim 8, further comprising a plurality of transistors provided on the first transparent substrate base, a plurality of first electrodes each of which is electrically connected to a drain or a source of one transistor, and a plurality of second electrodes provided on the first transparent substrate base or the second transparent substrate base.

10. The liquid crystal lens according to claim 9, wherein the plurality of transistors comprise thin film transistors.

11. The liquid crystal lens according to claim 1, further comprising a plurality of transistors provided on the first transparent substrate base, a plurality of first electrodes each of which is electrically connected to a drain or a source of one transistor, and a plurality of second electrodes provided on the first transparent substrate base or the second transparent substrate base.

12. The liquid crystal lens according to claim 11, wherein the plurality of transistors comprise thin film transistors.

13. Liquid crystal glasses, comprising lenses and a spectacle frame, the spectacle frame comprises two optical frames for the left and right eyes which are joined together and legs connected to the optical frames, wherein each of the lenses is liquid crystal lens comprising:
   a first substrate and a second substrate which are aligned-and-assembled, and a liquid crystal layer disposed between the first substrate and the second substrate, wherein the first substrate comprises a first transparent substrate base, and a first alignment film comprising a plurality of first alignment grooves, the first alignment film is provided on the first transparent substrate base, the first alignment grooves extend to the edge of the liquid crystal lens in annular shapes with a geometric center located at the geometric center of the liquid crystal lens, the second substrate comprises a second transparent substrate base, and a second alignment film comprising a plurality of second alignment grooves, the second alignment grooves correspond to the first alignment grooves, and the second alignment film is provided on the second transparent substrate base, and the liquid crystal layer is disposed between the first alignment film and the second alignment film.

14. The liquid crystal glasses according to claim 13, wherein the liquid crystal lens comprises a plurality of transistors, a plurality of first electrodes and a plurality of second electrodes, the liquid crystal glasses further comprise a driving module provided inside the spectacle frame and for driving the liquid crystal molecules in the liquid crystal layer of the liquid crystal lens to deflect.

15. The liquid crystal glasses according to claim 14, further comprising at least one camera provided on the surface of the spectacle frame, and a gesture identifying module and a control module provided inside the spectacle frame; wherein the at least one camera is used for capturing a gesture of a user and transmitting it to the gesture identifying module;

the gesture identifying module is used for obtaining a gesture instruction corresponding to the gesture based on the captured gesture and transmitting the gesture instruction to the control module; and the control module is used for controlling the driving module to drive the liquid crystal molecules in the liquid crystal layer of the liquid crystal lens to deflect based on the gesture instruction.

16. The liquid crystal glasses according to claim 15, wherein the gesture identifying module comprises a memory unit for storing a corresponding relationship between the gesture and the gesture instruction.

17. The liquid crystal glasses according to claim 15, wherein the number of the at least one camera is one, and the camera is provided on either of the optical frames or at the joint of the optical frames.

18. The liquid crystal glasses according to claim 15, wherein the number of the at least one camera is two, and the cameras are provided on the optical frames respectively.

19. The liquid crystal glasses according to claim 14, further comprising at least one power supply device provided inside the legs.

20. The liquid crystal glasses according to claim 19, further comprising a switch for controlling the power supply of the power supply device.

* * * * *